United States Patent [19]
Korthuis et al.

[11] Patent Number: 5,660,033
[45] Date of Patent: Aug. 26, 1997

[54] RAISIN HARVESTING APPARATUS AND METHOD

[75] Inventors: Donald L. Korthuis, Lynden; Scott A. Korthuis, Whatcom County, both of Wash.

[73] Assignee: Korvan Industries, Inc., Lynden, Wash.

[21] Appl. No.: 303,316

[22] Filed: Sep. 8, 1994

[51] Int. Cl.$^6$ .................................................. A01D 46/00
[52] U.S. Cl. ........................................... 56/330; 56/331
[58] Field of Search .............................. 56/330, 331, 329

[56] References Cited

U.S. PATENT DOCUMENTS

| | | | |
|---|---|---|---|
| 4,022,001 | 5/1977 | Burton | 56/330 |
| 4,283,906 | 8/1981 | Scudder | 56/330 |
| 4,329,836 | 5/1982 | Scudder | 56/330 |
| 4,341,062 | 7/1982 | Scudder | 56/330 |
| 5,067,314 | 11/1991 | Burke | 56/330 |
| 5,101,618 | 4/1992 | Oldridge | 56/330 |
| 5,355,667 | 10/1994 | Scott | 56/330 |
| 5,423,166 | 6/1995 | Scott | 56/330 |

*Primary Examiner*—Terry Lee Melius
*Assistant Examiner*—Heather Shackelford
*Attorney, Agent, or Firm*—Robert B. Hughes

[57] ABSTRACT

A raisin harvesting machine adapted to harvest raisins from vines where the raisin bunches are positioned in an upwardly and outwardly extending growing plane. The machine has a beater rod assembly which is positioned at a lateral slant so as to have a substantial alignment component parallel to growing zone of the raisins. In some embodiments, the machine moves along one row, the beater rod assembly moves into and out of the crop row in a harvesting motion. When the harvesting machine moves at an opposite direction along an adjacent row, the beater assembly is moved to an opposite side of the harvesting machine so as to be properly positioned to engage the raisins in the second crop row.

45 Claims, 11 Drawing Sheets

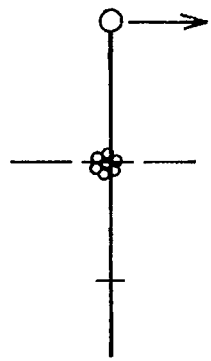
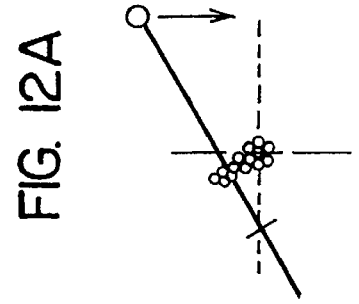
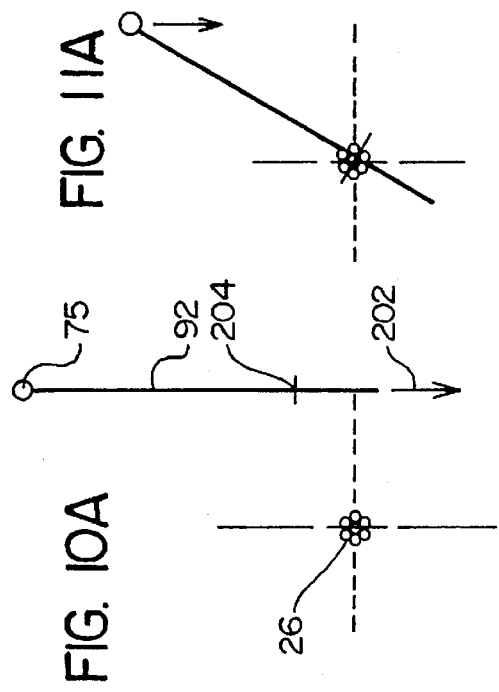
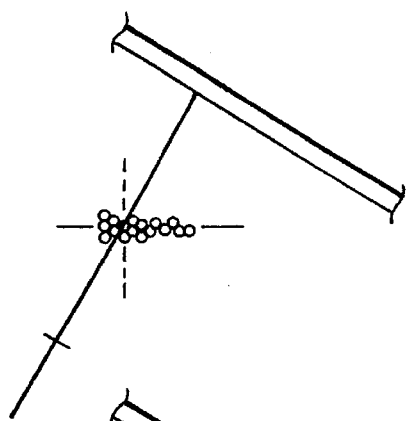
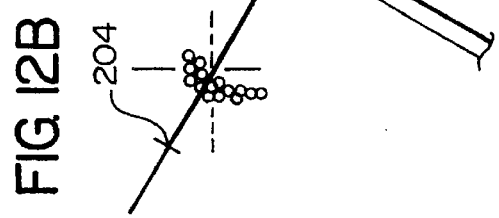
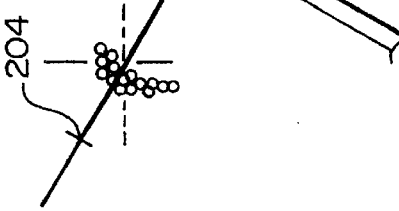
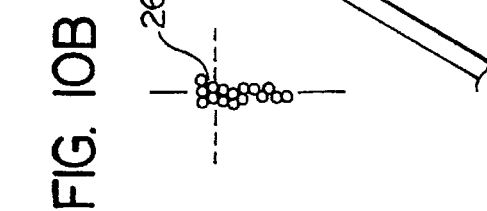

RAISIN HARVESTING APPARATUS AND METHOD

The present invention relates in general to an apparatus and method for harvesting raisins, and more particularly to an apparatus and method where the grapes which are to be harvested as raisins are grown from fruiting canes which extend from the stalks upwardly and laterally so that the bunches of grapes to become raisins are generally positioned relative to one another in a slanted plane.

BACKGROUND OF THE INVENTION

For many years the harvesting of raisins has largely been a manual operation. Raisins are simply grapes which are left on a vine which as been severed from the main stalk, so that the grapes dry into raisins. Then the bunches of dried grapes (which are now raisins) are manually gathered and the raisins removed from the stems and branches. Automated picking machines have not, to the best knowledge of the applicants, been particularly successful.

One common method of providing and harvesting raisins is for the workers to move down the row of upright grape plants, snipping off the bunches of grapes and permitting them to fall on paper sheets which rest on the ground. After several weeks of the grapes drying in the sun, these are then manually gathered so that the dried grapes (i.e. raisins) can be removed.

In recent years, there have been various attempts to improve the methods of growing grapes to increase the yield. One such attempt is to initially grow the grape plant upwardly so that it is vertically aligned, this commonly being accomplished by guiding the plant between laterally spaced wires that extend horizontally along posts that are arranged in rows. The uppermost vertically aligned shoot of the grape plant is called the primocane. In the first year of growth, this primocane does not grow grapes, but does so in the second year when it becomes a fruiting cane. One more recent attempt to improve the yield of the grapes is that early in the second year, the primocane shoots that have grown the prior year are moved out of vertical alignment and manually positioned so that they extend upwardly and laterally at about a 45° angle. This can simply be accomplished by providing a plurality of support arms that extend from the main posts at an upward and lateral slant (e.g. at 45°), and the primocane shoots are positioned on the wires which extend horizontally along these slanted arms. During the second year, the primocane shoots now become fruiting cane and bear the bunches of grapes.

When it is desired to harvest these grapes as raisins, the base of the fruiting cane branches are totally severed from the stalk, and these branches, with the grapes still hanging in bunches therefrom, are simply permitted to stay resting on the wires between the slanted arms. After several weeks, the grapes have dried sufficiently so that they now have become raisins ready for harvest.

While for many years there have been various types of harvesting machines to harvest a variety of fruit, such machines have not (to the best knowledge of the applicants herein) become adopted to any great extent for commercially harvesting grapes which are intended to be sold as fruit. One of the reasons for this is that it is rather difficult to remove the grapes from the stems. While some berries will drop from the stem or vines when the vine or stem is shakened, this has proven to be much more difficult with grapes, and also with raisins. For example, an accelerating force of only a few "G's" will shake many berries loose from the stems or vines. On the other hand, for grapes and raisins it may take a force substantially greater to shake the grapes or raisins loose.

Accordingly, when grapes are harvested in a manner so that there is little if any damage, this is generally a manual operation. When grapes are harvested by machines, they are generally smashed and damaged to a substantial extent, and these are grapes which are used for other purposes (e.g. wine), but not for grapes to be sold in the undamaged form.

It is with the foregoing in mind that the present invention has been developed.

SUMMARY OF THE INVENTION

The present invention is particularly adapted to harvest produce, such as raisins, which grow from plants in a crop row, where the plant portions bearing the produce extend from the crop row upwardly and outwardly in an upwardly and outwardly slanted growing zone in which the produce to be harvested is located. The growing zone has a width dimension parallel to an upward and outward slant of the growing slant and a thickness dimension perpendicular to the width dimension.

In the method of the present invention, there is provided a beater rod assembly comprising a rotatable shaft on which are mounted along the length of the shaft a plurality of beater rods extending radially outwardly from the shaft. The beater rod assembly is positioned adjacent to the crop row so that the shaft extends upwardly and outwardly from the crop row with a substantial axial alignment component parallel to the slant of the growing zone. The beater rods adjacent to the growing zone extend into the growing zone along a substantial portion of the width dimension thereof.

The beater rod assembly is moved forwardly along the crop row so that the beater rods rotate in a produce engaging path inwardly into the growing zone to a substantially portion of a width dimension thereof, and then outwardly from the growing zone, with the path having path portions with substantial vertical components of travel relative to the produce in the growing zone. Also, a back and forth motion is imparted to the beater rods as the beater rod assembly travels along the crop row. Thus, the beater rods engage the produce with a harvesting motion having substantial horizontal, vertical, and back and forth components of travel.

In one version, the back and forth movement of the beater rod assembly is an angularly oscillating movement where the beater rods move back and forth angularly about the axis of the shaft. In another version, the back and forth motion has a substantial component of back and forth movement parallel to a lengthwise axis of the shaft.

In the preferred mode of operation of the present invention, the produce grows from the plants in bunches which hang in the growing zone in vertical alignment from the plant branches. The vertical components of the harvesting path cause the beater rods to move, in at least a portion of the harvesting path, with a relative vertical alignment component of travel in harvesting contact with said bunches. More specifically, the beater rod assembly is aligned so that at least some of the beater rods rotate into an upward path into the growing zone so as to have vertical components of motion relative to the produce, and move out of the growing zone having downward components of motions relative to the produce.

In one mode of operation, the shaft additionally has an upward and forward alignment component relative to the crop row in an alternatively mode of operation, the shaft has additionally an upward and rearward slanted alignment component.

In a preferred mode of operation, the beater rod assembly is mounted to a harvesting machine which travels along crop rows in sequence. The method further comprises first aligning the shaft assembly on one side of the harvesting machine so as to be in substantial alignment with, and adjacent to, the growing zone of the one crop row. Then the beater rod assembly is moved to an opposite side of the harvesting machine when traveling in an opposite direction along a second crop row so that the beater rod assembly is in substantial alignment with, and adjacent to, the growing zone of the second crop row.

In one particular embodiment of the present invention, an upper end portion of beater rod assembly is connected to a lower end of a positioning rod, and the beater rod assembly is located on one side of the harvesting machine. An upper end of the positioning rod is pivotally mounted at an upper center location. Then the upper end of the beater rod assembly is moved in an arcuate path by rotating the positioning arm about the center pivot location to move the beater rod assembly to an opposite side of the harvesting machine. Desirably, this is accomplished in a manner to provide yet a second positioning arm and connecting one end of the second positioning arm to a lower end portion of the beater rod assembly and another end of the second positioning arm at a lower center location. The lower end of the beater rod assembly is moved in an arcuate path to the opposite side of the machine.

In yet another arrangement, there is provided a positioning arm which is in substantial alignment with the shaft, with a lower end of the positioning arm connected to the upper end of the beater rod assembly and an upper end of the positioning arm mounted for vertical movement. The beater rod assembly is moved from one side of the machine to an opposite side thereof by moving the positioning arm rotatably to cause the beater rod assembly to move from the one side of the machine to a center position of the machine to an opposite side thereof.

In yet another arrangement, the lower end of the positioning rod is connected to the upper end of the beater assembly and an upper end of the positioning arm is at an upper center location. The positioning arm is moved about a vertical axis conincident with the upper center location circularly so that the beater assembly moves in a generally horizontal arcuate path from one side of the machine to the other opposite side of the machine.

The apparatus of the present invention comprises a mobile chassis adapted to travel along the crop row, and beater assembly as described above. There is mounting means to position the beater rod assembly so as to be properly positioned and aligned with the growing zone of the crop row, as described above. There is power means to move the chassis along the crop row and to cause the beater rods to rotate in the produce engaging path with the crops being harvested. Also, the mounting means is arranged so as to position the beater rod assembly as described above, and also to move the beater rod assembly from one side of the apparatus to the other, so that the apparatus can move sequentially along adjacent crop rows in opposite directions.

Other features of the present invention will become apparent from the following detailed description.

BRIEF DESCRIPTION OF THE DRAWINGS

FIGS. 10A through 17A are schematic top plan views, showing in sequence a single beater rod moving through a half revolution and engaging a single bunch of raisins hanging from a fruiting cane, this being done to illustrate the manner in which the beater rod engages and moves relative to the raisin bunch at various locations;

FIGS. 10B through 17B are front elevational views of the beater rod shown in the various positions of 10A through 17A, respectively.

DESCRIPTION OF THE PREFERRED EMBODIMENTS

Figure 1:
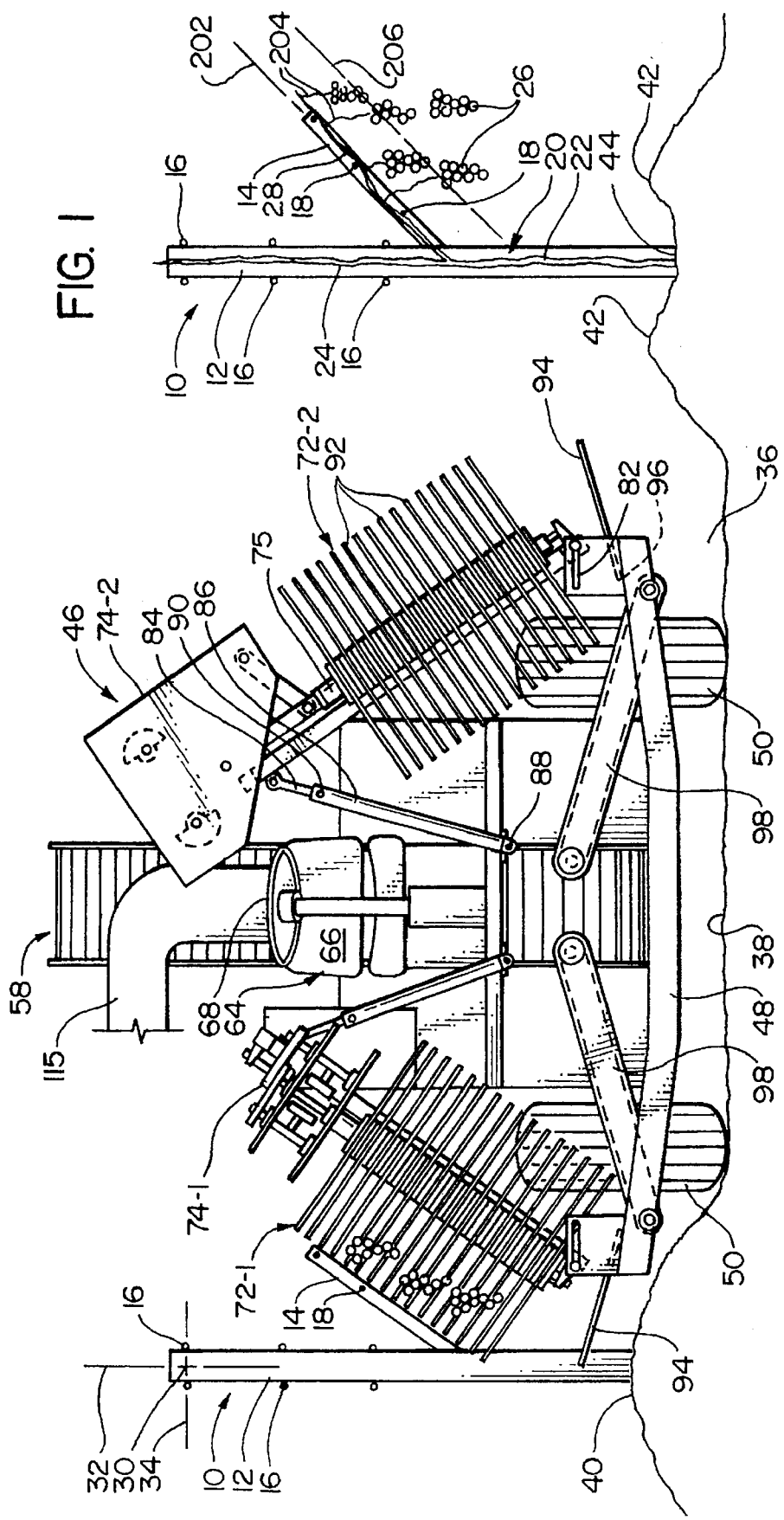
FIG. 1 is a front elevational view showing two crop rows of grapes which have matured into raisins, and also showing a first embodiment of the present invention.
Figure 2:
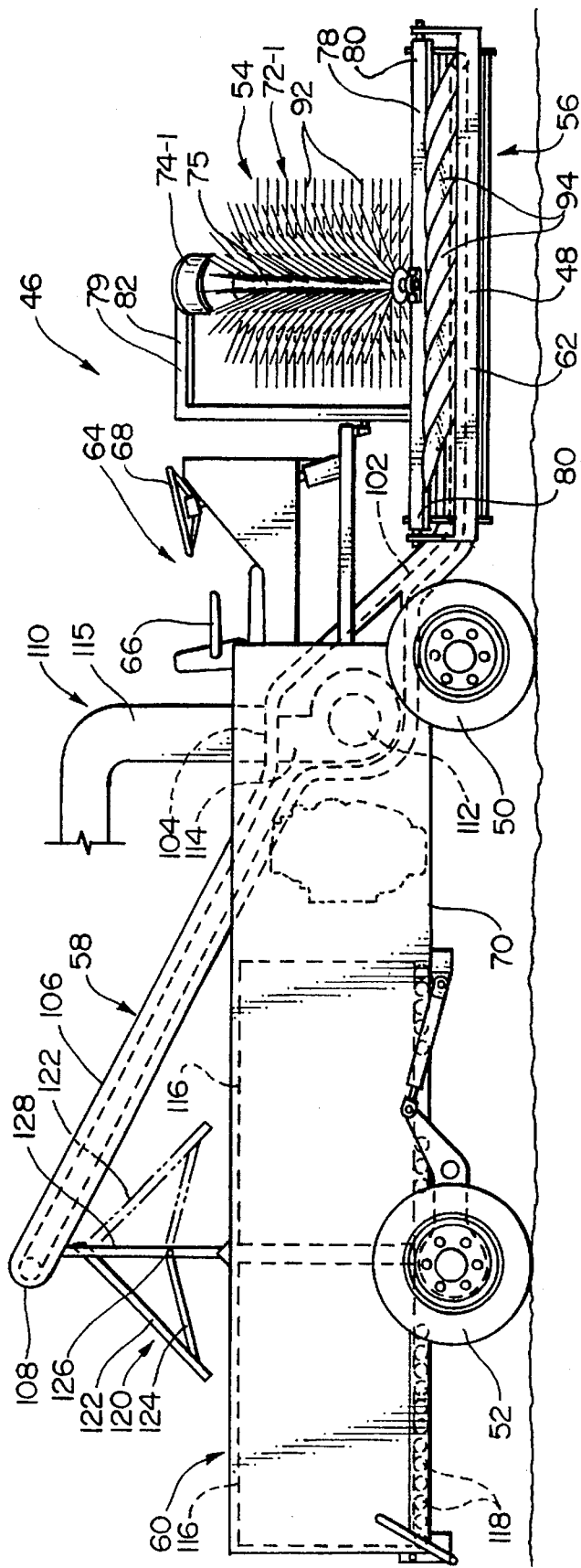
FIG. 2 is a side elevational view of the apparatus shown in FIG. 1.

Reference is first made to FIG. 1, which shows a pair of adjacent crop rows 10 where grapes are being grown to be harvested as raisins, and also showing in front elevation a first embodiment which is a prototype of the present invention to be presently used for testing and further development.

It is believed that a clearer understanding of the present invention would attained by first describing briefly the manner in which these grapes are being grown in the crop rows 10. For each crop row there is a plurality of posts 12 which are positioned at intervals along the middle of the crop row 10 to support the grape plants. At each post 12 there is an arm 14 mounted at a mid location on the post and extending upwardly and laterally therefrom. There is a plurality of longitudinally extending wires 16 extending along opposite sides of the post 12, and also a plurality of longitudinal wires 18 connected to and extending longitudinally between the arms 14.

As indicated previously herein the present invention is particularly adapted to harvest raisins which are grown from grapes in the particular manner shown in FIG. 1. The grape plant 20 has a main stalk 22 which grows upwardly in alignment with the post 12. There is for each stalk 20 a number of primocanes 24 which in their first year of growth are caused to grow upwardly so as to be vertically aligned between the wires 16. After the first year of growth, each primocane is manually moved from its vertical position between the wire 16, and then moved over to rest upon the support wires 18 that extend between the arms 14. Thus, the primocane branches slant upwardly and laterally at approximately a 45° angle from the vertical (which is the approximate angle of the arms 14).

In the second year of growth the primocane branches begin to bear grapes, and these grow in elongate bunches 26 which hang laterally from the wires 18. These bunches of grapes can, under proper growing conditions, be as large as a foot to a foot and one half in length. When the primocane branches start to bear fruit, these are then called "fruiting cane", which is designated 28.

If these grapes are to be harvested as raisins, several weeks prior to harvesting, each fruiting cane is cut through at its base so as to separate it totally from its stalk 22. Thus, growth stops and the grapes which remain in bunches 26 hanging from the fruiting cane 24 begin to dry out. When the drying has proceeded for a certain length of time, the raisins are ready for harvesting.

As indicated above, the present invention is particularly adapted for harvesting raisins grown in the manner described immediately above, as shown in FIG. 1.

For purposes of description, each crop row 10 of grape plants shall be considered as having a longitudinal axis 30 which extends along the length of the crop row, a vertical axis 32, and a transverse horizontal axis 34. The space between each adjacent crop row 10 is clear so as to provide an access path 36, and the main portion of the access path 36 comprises a flat dirt surface 38 which is the pathway. The stalks 22 will often be grown from a berm earth 40 which is raised to some extent. Alternatively, it is also common that there may be on opposite sides of each crop row two raised ridges 42 of dirt, with the two ridges 42 defining a ditch or flow path 44 for irrigating water. The simple single ridge 40 of raised dirt is shown at the left of FIG. 1, while the two ridges 42 defining the irrigation ditch or trough 44 therebetween is shown at the right in FIG. 1.

The first embodiment of the present invention was built as a prototype for testing and further development of the present invention, and this is shown in FIGS. 1 through 6 and is designated 46. This machine 46 comprises a chassis 48 which rides on a pair of front wheels 50 and a pair of rear wheels 52. The machine 46 comprises a front harvesting section 54 and a collecting section 56 below the harvesting section 54 to catch the raisins as they drop from the vines. Then the raisins which are deposited at the collecting section 56 are carried by a conveyor mechanism 58 which carries the raisins to a storage section 60.

The chassis 48 comprises a forward generally rectangular frame portion 62 which supports the harvesting section 54, the collecting section 56, and the forward part of the conveying section 58, and also provides support for an operator's station 64 where there is a seat 66 and steering mechanism 68. The forward frame portion 62 is supported in cantilever fashion from the main support frame which is shown somewhat schematically at 70 (FIG. 5) which in turn is supported from the wheels 50 and 52.

The harvesting section 54 is considered to be particularly significant in the present invention. At this point, the harvesting section 54 will be described somewhat briefly, along with the other components of the machine of the present invention. After that, the details of structure and functioning of the harvesting section 54 will be described in more detail.

It was indicated previously that the machine 46 of the first embodiment is a prototype used for testing and further development. This harvesting section 54 of the particular machine 46 was built with left and right beater assemblies 72-1 and 72-2. These beater assemblies are substantially identical, except that the left beater assembly 72-1 is provided with an oscillating drive mechanism 74-1 which provides an angular oscillating movement about the longitudinal axis of the shaft, while the other beater assembly 72-2 has a second oscillating drive mechanism 74-2 which imparts a back and forth oscillating movement parallel to the lengthwise axis of its related shaft 72-2. These two oscillating drive units 74-1 and 74-2 each can be (in and of themselves) of conventional design, so these will not be described in detail herein. In this prototype both mechanisms 74-1 and 74-2 are provided so that comparisons can be made in the performance of these beater assemblies 72-1 and 72-2 in varying situations.

Also, as will be disclosed later herein, the angular position of the two beater assemblies 72-1 and 72-2 can be adjusted to a variety of angles, all the way from a vertically upright position, to a slanted position of an angle of 30° to the vertical or possibly greater. Also, the chassis 48 has its wheels 50 and 52 adjustable so that not only can these accommodate irregularities in the ground surface, but the entire machine can be adjusted vertically so that the beater assembly 72-1 and 72-2 can be moved upwardly or downwardly relative to the crop rows 10.

Since the two beater assemblies 72-1 and 72-2 are substantially identical except for the differences in the oscillating drive mechanism 74-1 and 74-2, the following description will apply to both beater assemblies 72-1 and 72-2, and only the numerical designation 72 will be used, it being understood that this applies to both beater assemblies 72-1 and 72-2.

Figure 4:
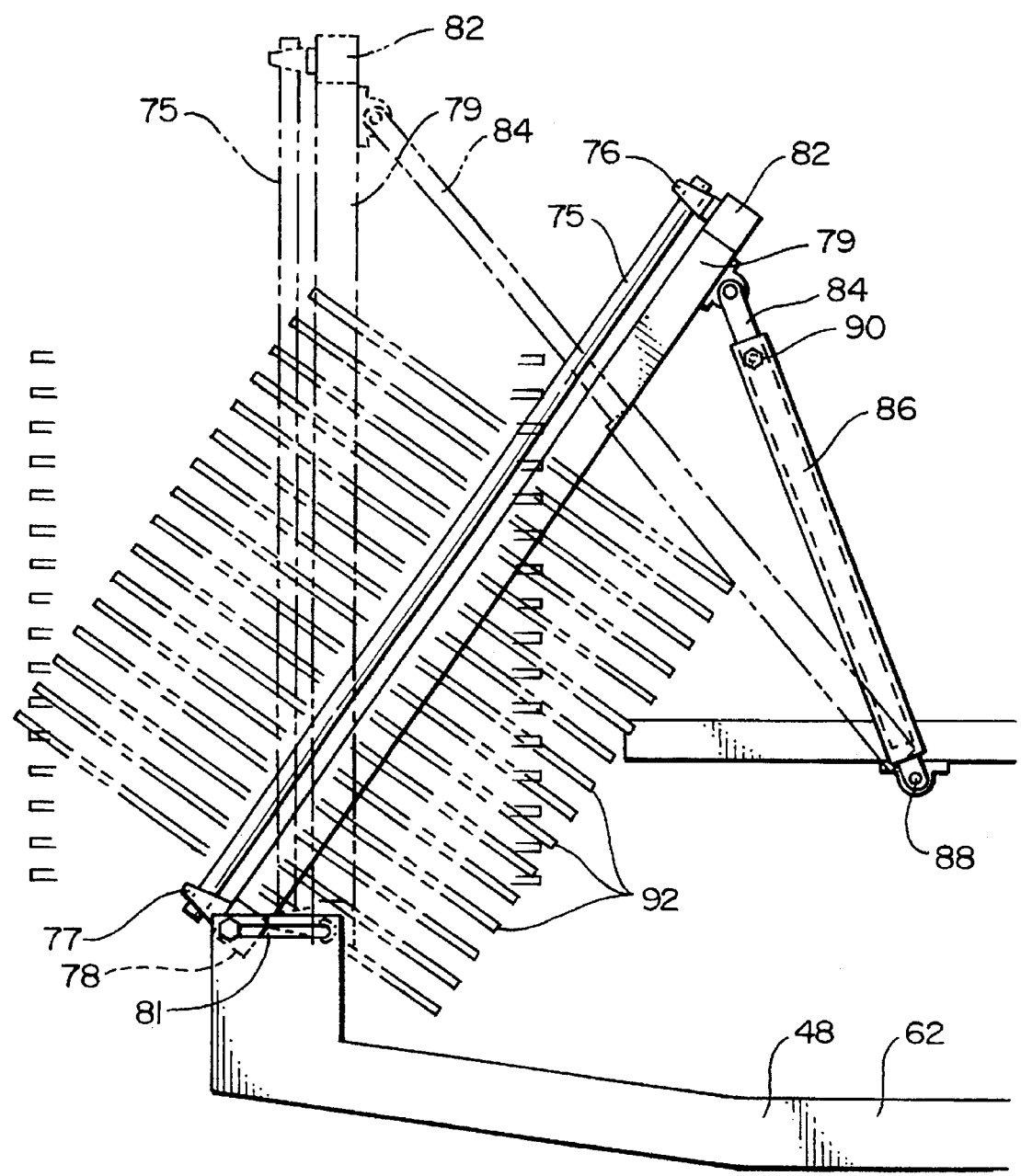
FIG. 4 is a front elevational view of one of the beater assemblies of the present invention shown in two different positions.

Each beater assembly 72 comprises an elongate shaft 75 which is rotatably mounted at upper and lower end mounting locations 76 and 77, respectively (See FIG. 4). The lower mounting location is connected to a lower bar 78 of a mounting frame 79, the opposite forward and rear ends 80 of which are connected to a slide mount 81. The upper rod end 76 is connected through the oscillating drive mechanism 74 pivotally to an upper bar 82 of the frame 79. the upper part of the frame 79 is connected to the upper end of a rod 84 which is mounted in telescoping fashion within a tubular support member 86 which in turn is pivotally mounted at its lower end 88 to structure of the chassis frame portion 62. The rod 84 and mounting tube 86 are provided with an adjustable pin connection 90 so that the rod 84 can be extended or retracted to change the alignment of the shaft 76 to various angles. In FIG. 1, each rod 84 is in a more retracted position, where the related shaft 76 is at approximately a 30° slant with the horizontal. As shown in FIG. 4, the rod 84 can be extended to move the shaft 76 to an upright position.

Mounted to each shaft 76 is a plurality of radially extending beater rods 92. These beater rods 92 are arranged in sets, each set lying in a related single plane perpendicular to the shaft 75, and each set being vertically spaced from one another. In the present preferred embodiments, the number of rods 92 in each set can be anywhere from twelve to twenty rods (spaced from each other at equal angles). Adjacent upper and lower sets of rods 92 can also have the angular position of their rods shifted from the position of the adjacent rods above and below. In the particular arrangement shown herein, each set of rods 92 is shifted angularly with respect to the rods immediately above, by being shifted angularly by an angular increment equal to half the angular spacing of each adjacent pair of rods in each set. The vertical spacing of the sets of rods, measured from the center lines of each set of rods, is between about two to four inches.

As is common in the prior art, the shaft 75 is arranged to be freely rotatable. Alternatively, the rods 92 can be mounted to a tubular member mounted circumjacent to the shaft 76 and this tubular mounting member is mounted for free rotation. Thus, during harvesting, the rods 92 extend into the fruit being harvested, and as the machine travels down the length of the crop row 10, the rods rotate into the fruit plant, while having the oscillating motion superimposed over the rotating motion, and continue rotating out of the fruit plant.

Figure 3:
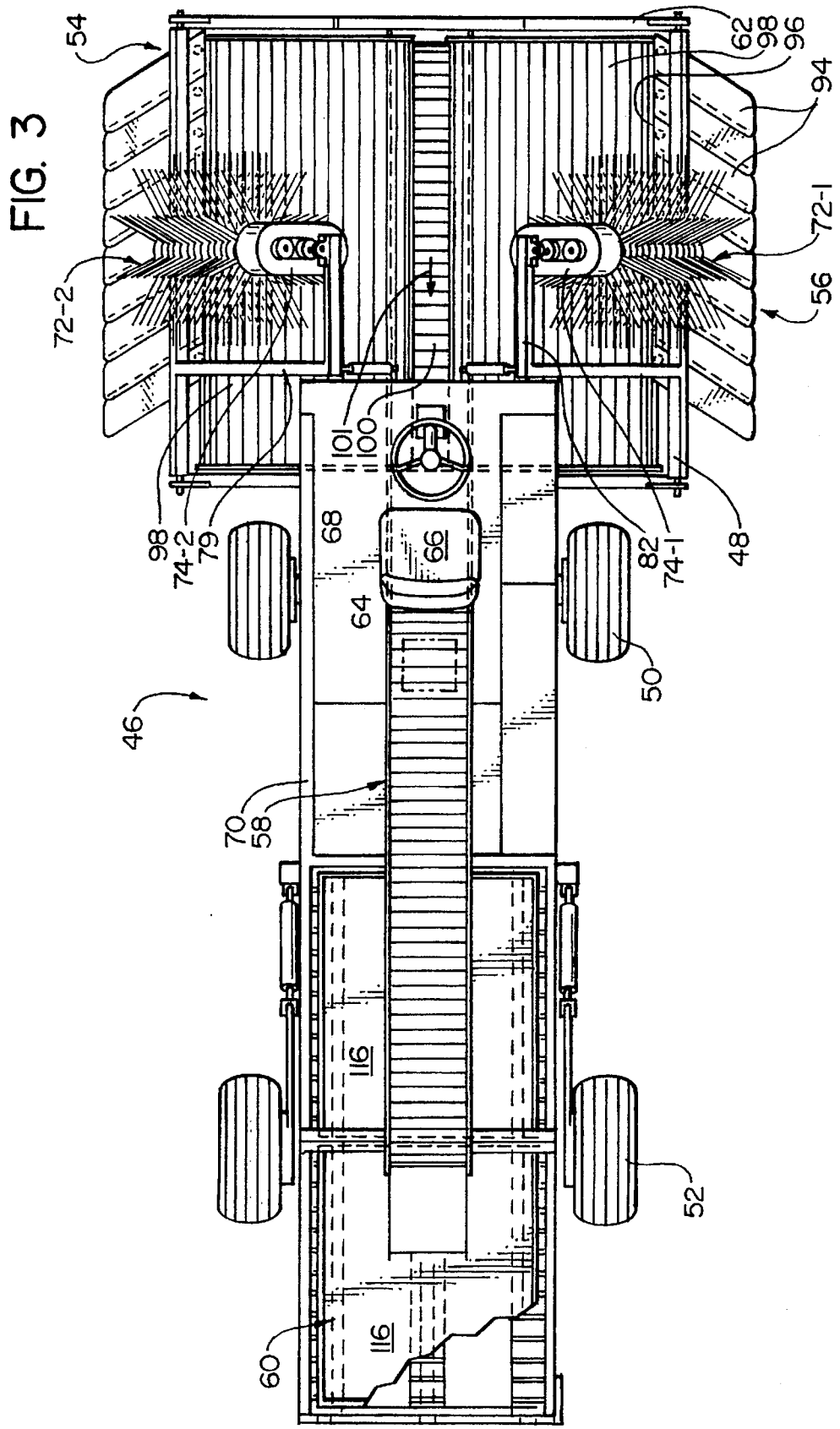
FIG. 3 is a top plan view of the apparatus shown in FIGS. 1 and 2.

The collecting section 56 comprises a plurality of overlapping catch plates 94 (sometimes called "fish plates"). As is known in the prior art, these catch plates 94 can be pivotally mounted at their inner ends 96. These catch plates 94 overlap one another so as to be able to deflect around the posts 20 and the stalks 22, while still providing a substantially uninterrupted surface. The plates 94 are sloped downwardly toward the center of the machine so that the raisins falling thereon move toward the center and then fall on a related one of two belt conveyors 98 which carry the raisins laterally and upwardly toward the center of the machine. As can be seen in FIG. 3, the two conveyors 98 have substantial forward to rear length (i.e. perpendicular to the path of travel) and extend a reasonable distance both forwardly of and behind the beater assemblies 72.

As the raisins are carried upwardly toward the center by the belt conveyors 98, the raisins drop onto the upper rearwardly traveling run of a longitudinally aligned, center conveyor belt 100. The upper run of the conveyor belt 100 travels rearwardly in a horizontal direction at the location shown at 101, then travels upwardly as at 102, and thence over a short horizontal belt portion 104. The upper run of the conveyor then continues further upwardly at 106 to discharge the raisins at 108.

At the location of the belt portion 104, there is provided a blower 110 which has a fan section 112 which directs the air upwardly through a duct 114 to blow through the conveyor 104. This blowing action removes the leaves, twigs and other debris which exit from an upper duct 115.

The collecting section 56 in this particular embodiment comprises a pair of bins 116 mounted on rollers 118 for easy loading and unloading. The raisins can selectively be directed toward one bin 116 or the other, this being accomplished by the mechanism indicated at 120. This mechanism 120 comprises a platform 122 pivotally connected by a set of arms 124 at a pivot location 126 to a pair of vertical posts 128. When the platform 122 is in the solid line position of FIG. 2, the raisins are moved rearwardly to the rear bin 116. On the other hand, when the platform 122 is moved to the broken line position of FIG. 2, the raisins will be deposited in the forward bin 116.

Figure 5:
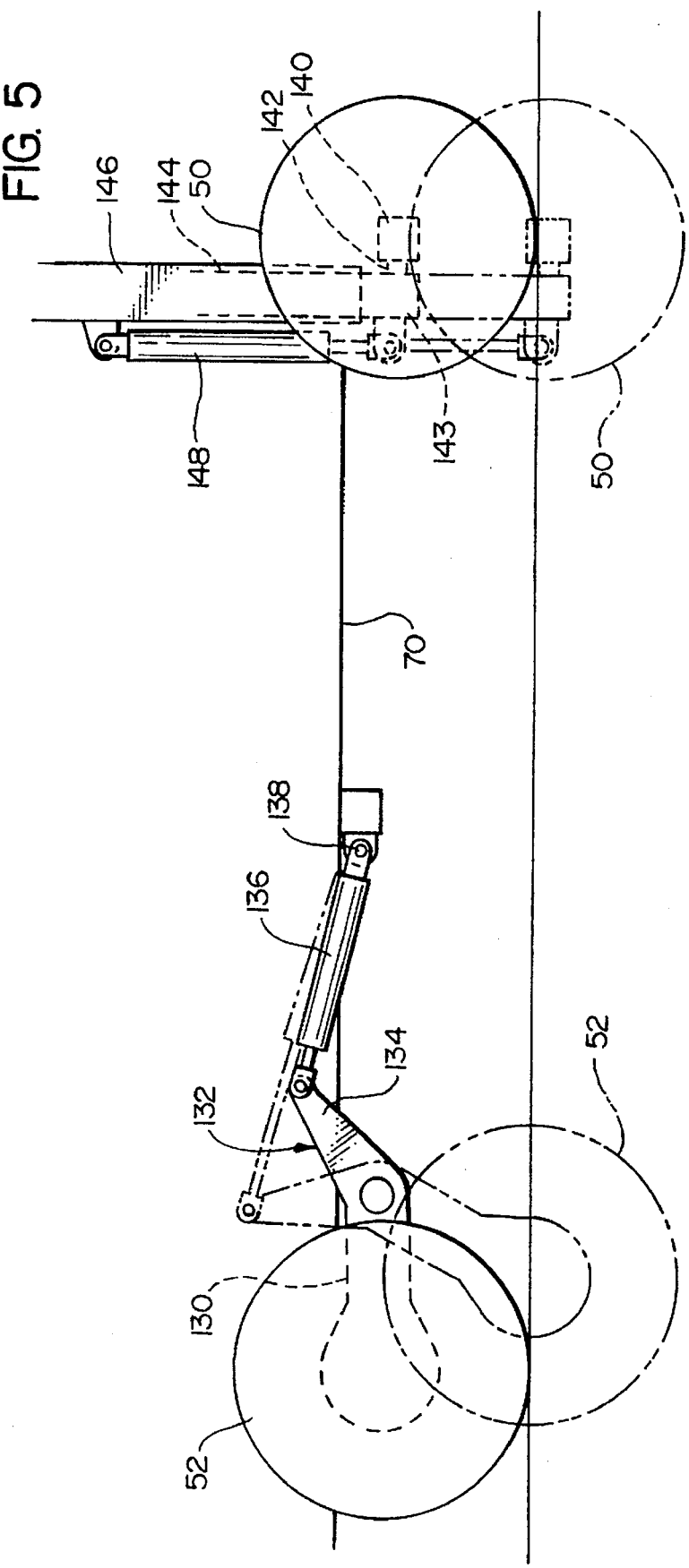
FIG. 5 is a side elevational view of the wheel support system of the present invention, showing the manner in which the elevation of selected front and rear wheels can be changed.

Reference is made to FIG. 5, which illustrates the manner in which the height of the rear wheels 52 can be adjusted relative to the chassis 48 to lower or raise the chassis and the rest of the machine 46. Each rear wheel 52 is rotatably mounted to the outer arm 130 of a bell crank 132, the other arm 134 of which has its outer end pivotally connected to a hydraulic piston 136, which is pivotally connected at 138 at its other end to the chassis frame 70. It is apparent that by extending either of the hydraulic pistons 136, the related rear wheel 52 is moved downwardly to raise the chassis frame 70. Both wheels 52 are similarly mounted, and each can be raised or lowered independently of the other. An advantage of this is that in some situations, depending upon the ground adjacent to the crop row 10, the wheels on one side or the other of the machine may be at a higher elevation. For example, as shown in FIG. 1 (right hand side), there are the ridges 42 which are on opposite sides of the crop row. In some instances, these ridges 42 are positioned at the location where one pair of forward and rear wheels might be located, so as to tilt the machine 46. This can be compensated for by this wheel adjustment mechanism.

Figure 6:
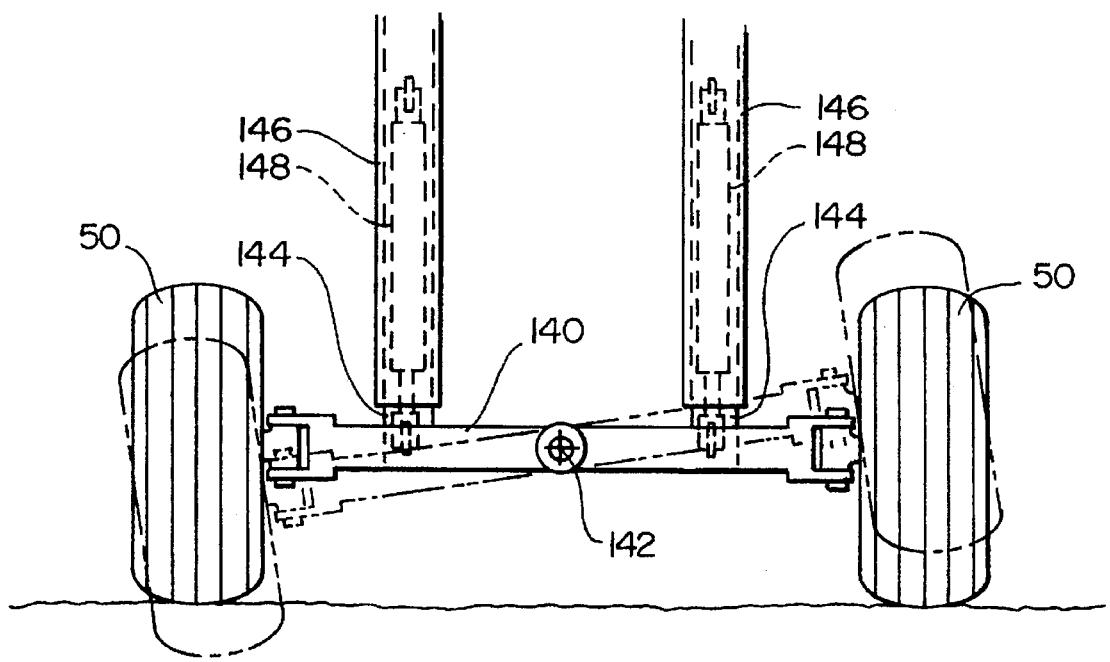
FIG. 6 is a front elevational view showing the two front wheels of the present invention, these being shown at different elevations to illustrate how these accommodate irregularities in the ground surface.

FIG. 6 illustrates the mounting of the front wheels 50. The front wheels 50 are connected to a cross arm 140 which in turn is pivotally mounted at its center location 142 to a horizontal mounting bar 143 that in turn is mounted to two vertical arms 144 slide mounted within posts 146. The bar 143 is connected to two laterally spaced hydraulic jacks 148. The jacks 146 are moved together to raise or lower the bar 143 to raise or lower the pivot connection 1452. The arm 140 pivots to permit the positions of the wheels 50 to be varied, as shown in FIG. 6.

The grapes that are grown in the manner shown in FIG. 1 are in bunches positioned along an upward and laterally slanted plane on only one side from the posts 12. Also, the alignment of the rows is generally oriented so as to maximize exposure of the fruiting canes 28 to the sun. Accordingly, when the machine 46 travels down between two crop rows, only one beater assembly 72 is operating to harvest the raisins.

Also, it is common in operating harvesting machines, that a harvesting machine will travel down one row in one direction, turn around at the end of the row, and then travel along an adjacent path between two rows in the opposite direction. Thus, when the machine of the present invention is traveling in one direction, the beater assembly 72 must be positioned on the right side of the machine at a downward and outward slant, and when the machine is traveling in the opposite direction along an adjacent pathway, the beater assembly must be on the left side of the machine at a downward and outward slant. This is accomplished in the first embodiment of FIGS. 1–6 by having two beater assemblies 72.

Figure 7A:
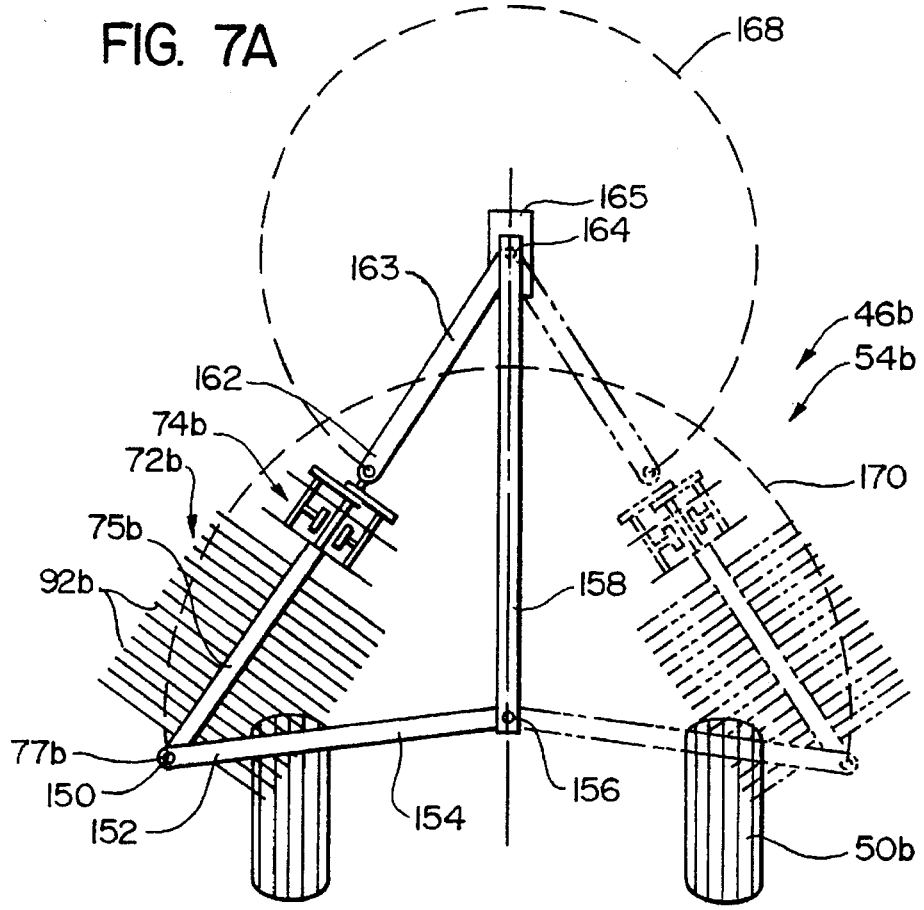
FIG. 7A is a somewhat schematic front elevational view of a second embodiment of the present invention, having only one assembly, mounted so that it can be conveniently moves from one side of the machine to the other.
Figure 7B:
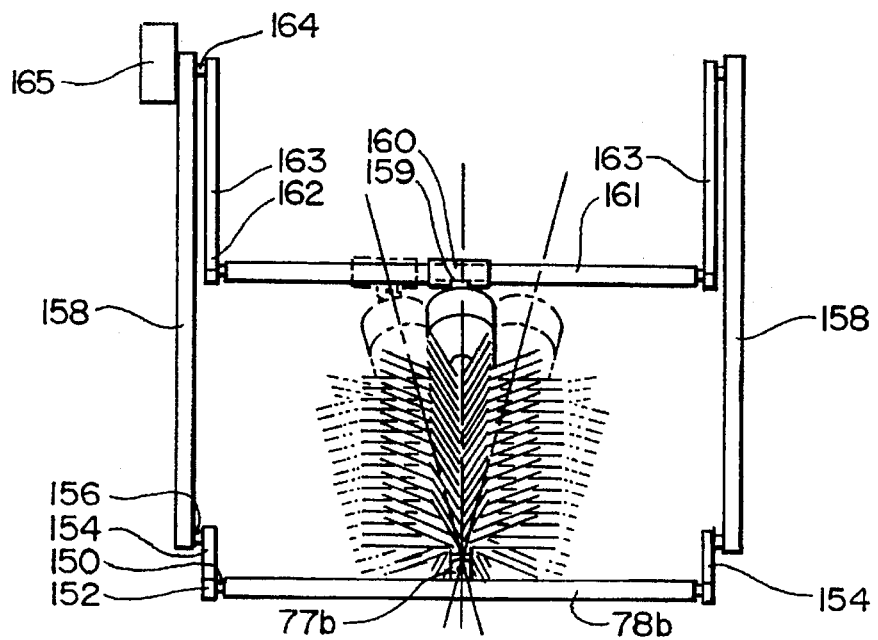
FIG. 7B is a side elevational view of the embodiment showing only the beater assembly and the mechanism for moving and positioning the beater assembly at one side or the other.

To accomplish this in a manner to use only one beater assembly, there is shown in FIGS. 7A and 7B a second embodiment of the present invention. Components of this second embodiments which are similar to components of the first embodiment will be given like numerical designations, with a "b" suffix distinguishing those of the second embodiment. In FIGS. 7A and 7B, the machine 46b is shown rather schematically, and only part of the harvesting section 546 and the two front wheels 506 are shown for ease of illustration. It is to be understood that the chassis, the collecting section 56, the conveying section 58 and the storing section 60 are, or may be, the same as shown in FIGS. 1 through 6.

In the second embodiment of FIG. 7A and 7B, there is a single beater assembly 72b having an oscillating drive mechanism 74b, a shaft 75b and sets of beater rods 92b. The lower end 77b of the shaft 75b is rotatably mounted to a lower longitudinally extending bar 78b that has at its forward and rear ends pivot connections 150 to the outer ends 152 of forward and rear positioning rods 154. The inner ends of the positioning rods 154 are pivotally connected at forward and rear stationary locations 156 to the lower ends of stationary forward and rear center posts 158.

The upper ends of the shaft 75b are connected to the oscillating drive mechanism 74b which in turn is pivotally connected at 159 to a longitudinally adjustable mounting sleeve 160 which is in turn slide mounted to a longitudinal bar 161. The forward and rear ends of the bar 161 are each connected to the outer end 162 of one of a forward and a rear upper positioning arms 163. The inner ends of the positioning arms 163 are pivotally connected at 164 to the upper ends of the posts 158. The rear arm 163 is connected at its pivot location 164 to a rotary actuator 165 which is capable of rotating the arm 163 to cause the rotation of the arms 163 as shown in FIG. 7A.

It can be seen in FIG. 7A that the arms 163 are positioned along the left side of the machine (as seen in FIG. 7A) and in alignment with the shaft 75b so that the shaft 75b is slanting upwardly and laterally inwardly at about an angle of 30° to the horizontal. By rotating the arms 163 in a clockwise direction (as seen in FIG. 7A), the end pivot location 162 travel in an upward circular arc 168 to lift the beater assembly 72b upwardly. At the same time, this causes the arms 154 to rotate in a clockwise direction about the pivot locations 156, so that the lower end 77b of the shaft 75b follows the clockwise arcuate path indicated at 170. As can be seen in FIG. 7A7, after the arms 163 have traveled approximately a little over ¾th of a complete revolution, the beater assembly 72b becomes positioned on the opposite side of the machine 46b.

In operation, let it be assumed that the machine 46b is traveling down a pathway between two crop rows 10, with the beater assembly 72b on one side so as to harvest the raisins from that row 10. When the machine 46b reaches the end of the pathway, it makes a 180° turn and begins traveling down the adjacent pathway. At that time, the arms 163 are rotated as indicated in FIG. 7A to move the beater assembly 72b to the opposite side.

With reference to FIG. 7B, it can be seen that the mounting sleeve 160 can be shifted either forwardly or rearwardly so as to tilt the shaft 75b of the beater assembly 72b either in an upward and forward direction or in an upward and rear direction. This could be accomplished simply by manually moving the sleeve 160 and locking it in the desired position. The connection of the oscillating drive mechanism 74b can be made with an extendable connection (e.g. a spline connection) to permit this forward to rear adjustment. The significance of providing this forward and rear tilt will be discussed later herein when the overall operation of the apparatus or the present invention is discussed with reference to FIGS. 10A and 10B through FIGS. 17A and 17B.

Figure 8A:
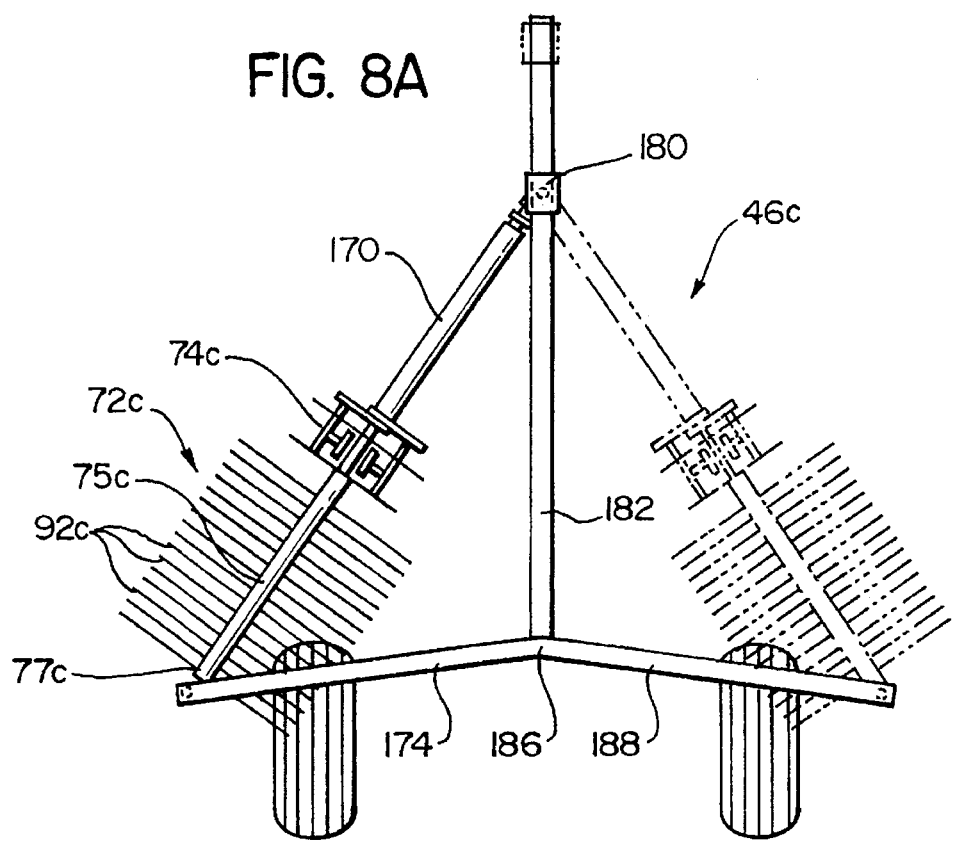
FIG. 8A is a somewhat schematic front elevational view showing a third embodiment of the present invention where the beater rod assembly can be moved from one side of the machine to the other in another manner.
Figure 8B:
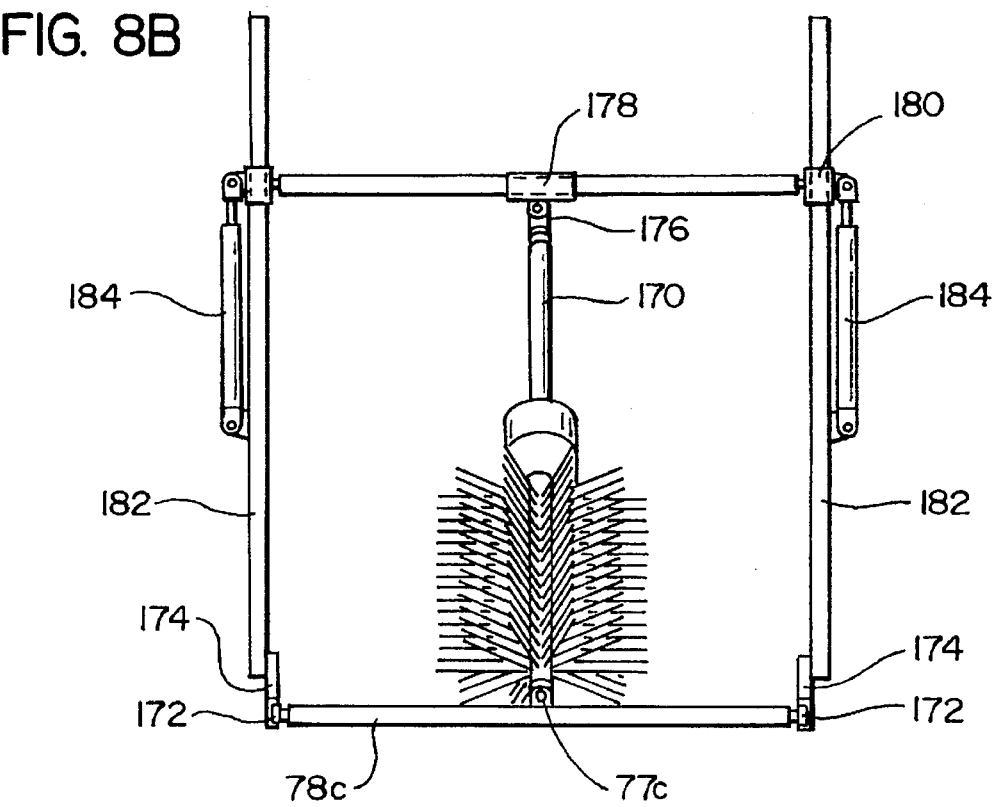
FIG. 8B is a side elevational view of the apparatus of FIG. 8A, showing only the beater assembly and the mechanism for moving and positioning the beater assembly on one side or the other.

FIGS. 8A and 8B show a third embodiment of the present invention. Components of this third embodiment which are similar to components of the other two embodiments will be given like numerical designations, with a "c" suffix distinguishing those of the third embodiment.

The machine 46c of FIGS. 8A and 8B is shown somewhat schematically, as in FIGS. 7A and 7B, it being understood that other components of the harvesting machine would be present, as illustrated in FIGS. 1 through 6.

The beater rod assembly 72c has, as in the second embodiment, the shaft 75c, the oscillating drive mechanism 74c, and the sets of beater rods 92c. The oscillating drive mechanism 74c is fixedly connected to a positioning arm 170 that is aligned with the shaft 76c.

The lower end 77c of the shaft 75c is connected to a longitudinally extending bar 78c that is mounted at forward and rear ends at 172 for sliding motion along forward and rear transversely extending slideway arms 174. The upper end of the arm 170 is pivotally connected at 176 to a sleeve 178 which can be adjusted longitudinally along an upper longitudinal rod 180 mounted to sleeves 182 that are slide mounted to forward and rear vertical posts 182. The two sleeves 180 are in turn connected to forward and rear hydraulic actuators 184 so that these can be moved upwardly or downwardly. It can be seen that as the sleeves 180 are moved upwardly, the mounting arm 170 and the beater assembly 72c are pulled upwardly so that the bar 78c slides at its forward and rear slide locations 172 so that the bar 78c moves toward a center position 186. Then the hydraulic actuators 184 are retracted to cause the beater assembly 72c to move over to the opposite side (as shown in the broken line of 78a, with the slide mounted ends 172 traveling in forward and rear slideway arms 188.

In addition, there could be provided a rotary actuator to insure that the forward and rear slideway mountings 172 move properly through the center location 186 from one set of slideway arms 174 to the other set of slideway arms 188. Alternatively, a rotary actuator could be substituted for the linear hydraulic actuators 184.

Further, as another alternative, a roller chain could be placed along the arms 174 and 188.

Figure 9:
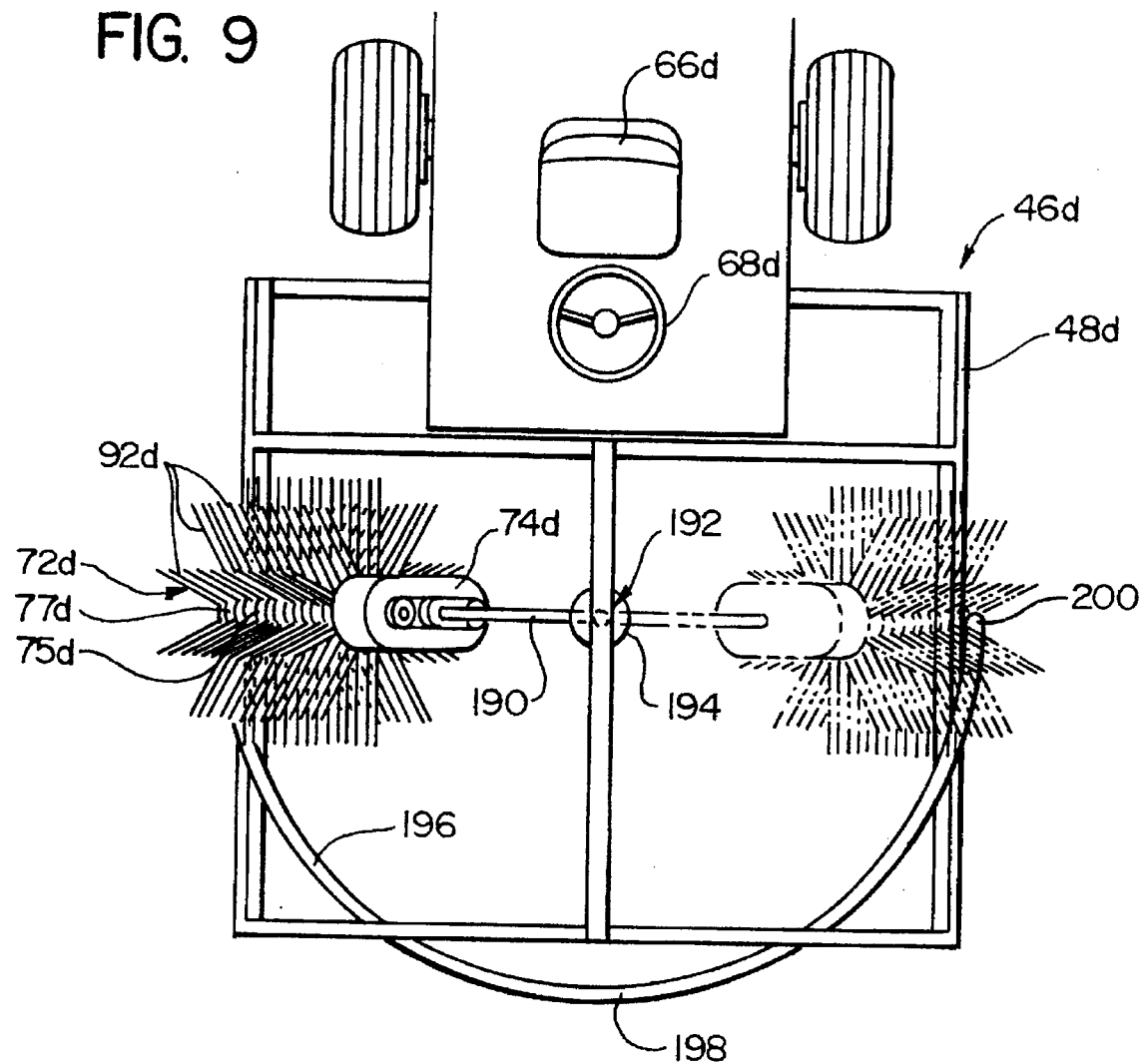
FIG. 9 is a top elevational view of a beater assembly of a fourth embodiment of the present invention, showing yet another arrangement to move the beater assembly from one side of the machine to the other.
Figure 14A:
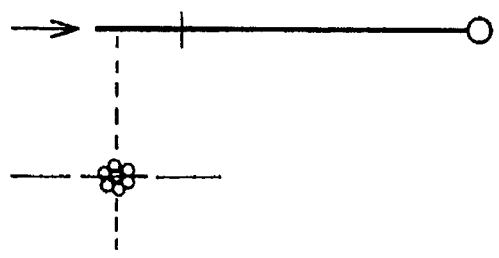

A fourth embodiment of the present invention is shown in FIG. 9. Components of this fourth embodiment which are similar to those of the prior embodiments will be given like numerical designations, with a "d" suffix distinguishing those of the fourth embodiment.

FIG. 9 is a top plan view of only the forward portion of the machine 46d. There is the chassis 48d, on which is supported a seat 66d and a steering mechanism 68d. There is a single beater assembly 72d, comprising a shaft 75d and the sets of beater rods 92d. The shaft 75d is connected to an oscillating drive mechanism 74d, which in turn is fixedly connected to a positioning arm 190. This positioning arm slants upwardly toward a center fixed mounting location 192. At the center mounting location 192 there is an actuator shown at 194 which rotates the arm 190 about a vertically aligned axis at the location 192.

Accordingly, when the beater assembly 72d is moved from one side to the other, it can be seen that the arm 190 and the shaft 75d describe a 180° path of travel, with the movement of the axis of the arm 190 and of the shaft 75d following a curved 180° segment of a conically shaped plane. The lower end 77d of the shaft 75d is slide mounted in a semi-circular track 196 that extends from a side location to a forward location 198 and then to a right hand location 200. It is evident by causing the actuator 194 to rotate the arm 190 in 180° around the vertical axis 192 that the beater assembly 76d is moved from one side to the other.

To describe other facets of the operation of the present invention, as indicated previously, with reference to FIG. 1, the arms 14 extend from the posts 12 in an upward and outward slant of approximately 45°. The fruiting canes 28 are aligned in a growing plane, indicated by the line 202 in FIG. 1 which generally parallels the orientation of the arms 14 and the plane defined by the support wires 18 that extend along the arms 14. The grapes 26 hang in bunches from the fruiting canes, and can be as long as a foot to a foot and one half, with the stems 204 of the bunches 26 extending vertically downward. The bunches commonly develop a relatively short distance below the fruiting cane 28 (e.g. the top of the grapes bunch being at about two to eight inches below the related fruiting cane from which they grow. Thus, the bunches 26 of grapes can be considered to lie in a generally planar harvesting zone 206 which extends upwardly and laterally at about the same angle as the growing plane 202.

By tilting the beater assembly 72 at an angle generally paralleling the planar orientation of the harvesting zone 206, the beater rods 92 are in a better position to extend into the grape plant far enough along the entire length of the fruiting canes 28. In addition to this, however, this tilting of the beater assembly 92 relative to the vertical axis is believed to provide a somewhat different action of the beater rods relative to the fruit being harvested. Also, analysis indicates that this orientation provides functions which differ from the harvesting actions obtained by prior art berry or fruit harvesting machines, and it is believed this can provide certain particular benefits relative to raisin harvesting.

To explain this further, reference is made to FIGS. 10A through 17A and 10B through 17B which show the path of travel of a single beater rod 92 relative to a single bunch of raisins 26.

FIGS. 10A through 17A are top plan views which show only a single shaft 75, a single beater rod 92, and a single bunch 26 of raisins. The views 10B through 17B are front elevational views, with FIG. 10B corresponding to FIG. 10A, FIG. 11B corresponding to FIG. 11A, etc. For ease of illustration, in FIGS. 10A through 17A the shaft 75 is shown only as a single small circle at the point of attachment to the rod 92. However, it is to be understood that in reality, if the shaft were viewed from a top plan view, having a slant of 30° or so (as shown in FIGS. 10B through 17B), a linear dimension of the shaft 75 would be seen.

To comment generally on the path of travel described by the single beater rod 92, it can be seen that with the rod 92 being perpendicular to the lengthwise axis of the shaft 75, the circular path described by the rod 92 lies in a single slanted plan which is perpendicular to the length of the shaft 75. As will be apparent from viewing the sequence of FIGS. 10B through 17B, the rod, in traveling its semi-circular path into and from the crop row, moves first upwardly and inwardly and then downwardly and outwardly out of the crop row. The action of this, relative to a single bunch 26 of raisins will now be analyzed as we proceed sequentially through the FIGS. 10A–17A and 10B–17B.

In this description, it will be assumed that the beater assembly (of which the shaft 75 and beater rod 92 are a part) is mounted for free rotation so that as the harvesting apparatus is moving down the crop row, the engagement of the beater rods 92 with the crop row causes a rotational motion where each rod 92 rotates into the crop row as the shaft 75 is moving forwardly, and then out of the crop row.

In FIG. 10A, it can be seen that the rod 92 is pointing directly forwardly in alignment with the path of travel of the machine down the crop row, this forward path of travel being indicated by the arrow 202. In this position, the rod 91 is horizontally aligned, so that in FIG. 10B only the very end tip of the rod 92 is seen.

From FIGS. 10A through 15A, the rod 92 will be viewed as it moves through angular increments of 30°. FIG. 16A shows an increment of travel where the rod 92 has travelled only 15° from the location of FIG. 15A, with the increment of travel from FIG. 16A through 17A being an additional 15°.

In FIG. 10A, there is indicated a location 204 on the rod 92 which is that location which (after the rod 92 has rotated 30°) will be coming into engagement with the raisin bunch 26. It can be seen in FIGS. 11A and lib the rod has just engaged the raisin bunch 26 as the rod 92 is moving on an upward lateral slant. It can be seen that as the rod 92 moves to the position of 11A–11B to the position of FIGS. 12A–12B, the point of engagement 204 at which the rod 92 engages the raisin bunch in FIGS. 11A and 11B has now moved upwardly and inwardly, while the raisin bunch 26 is sliding across the rod 92. Also, it can be observed from FIGS. 11A–11B and FIGS. 12A–12B, the rod 92 is sliding to some extent along the length of the stem of the raisin bunch 26.

At this point, it should be noted that there are sets of rods vertically spaced from one another, and that a moderate distance below the rod 92 there will be another rod aligned therewith which would be likewise be engaging the raisin bunch at a lower location.

At the time that the rod 92 reaches the position of FIGS. 13A and 13B, the rod 92 is extending laterally outwardly and the raisin bunch 26 is hanging downwardly almost free from the rod 92. The reason for this change of the orientation of the raisin bunch 26 from FIG. 12A to that in FIG. 13A is that with the angular speed of the beater assembly 72 being substantially constant relative to its forward rate of travel, as the raisin bunch 26 comes closer to the center axis of the shaft 75, the linear rate of travel of the rod location adjacent to the bunch diminishes relative to the forward rate of travel of the machine.

As we view the position of the rod 92 relative to the raisin bunch 26 as we move from FIGS. 13A–13B to FIGS. 14A–14B, it can be seen that the harvesting machine is moving forwardly at a rate such that the rod 92 has in effect left the raisin bunch 26 behind. However, as we move from the position of the FIGS. 14A–14B to the position of FIGS. 15A–15B, the location 204 of the rod has now "caught up" with the raisin bunch 26 and is now beginning to move against the raisin bunch 26. Since the raisin bunch is now further away from the longitudinal center axis of the shaft 75, the linear rate of travel of the rod 92 at the location of the raisin bunch 26 has increased.

In the 15° increment of travel from FIG. 15A–15B to FIGS. 16A–16B, it can be seen that the rod 92 has moved laterally so that it is sweeping downwardly and laterally along the length of the raisin bunch 26. It can be seen in FIGS. 17A and 17B, the rod 92 has completed its 180° angular path of travel and is now pointing directly rearwardly.

It becomes apparent from the above analysis that in addition to the oscillating movement of the rod 92 relative to the raisin bunch 26 (either a vertical oscillating movement or an angular oscillating movement) there is imparted a sweeping motion of the rod 92 relative to the raisin bunch 26 where the rod 92 becomes (relative to the raisin bunch 26) moves at different locations along the length of the stem of the raisin bunch. In the initial movement from FIGS. 10A–10B through FIGS. 13A–13B, this is first a lifting movement along the length of the stem (FIGS. 11A–11B to FIGS. 12A–12B), and then a return upward movement (FIGS. 12A–12B to FIGS. 13A–13B). Then when there is reengagement (FIGS. 15A–15B) the movement from FIGS. 15A–15B to FIGS. 16A–16B is a downward sweeping movement along the length of the raisin bunch 26.

Also, it is to be observed that this vertical movement is accomplished by the rod 92 approaching the raisin bunch 26 at different sides of the raisin bunch 26. For example, as the rod is moving to the position of FIGS. 11A–11B, it is essentially approaching the side of the raisin bunch which is closer to the center path between the crop rows. On the other hand, when the rod 92 is in the position of FIG. 15A, it is now approaching the opposite side of the raisin bunch 26. Also, it is to be recognized that while we have only shown the action of one rod 92 on the raisin bunch 26, there are other rods vertically aligned and vertically spaced with the rod 92, and (depending upon the arrangement of the rods), other rods 92 that are both vertically and angularly spaced relative to the single rod 92 shown in FIGS. 10A-10B through 17A-17B. Thus several rods 92 may be acting on a single raisin bunch 26.

Figure 17B:
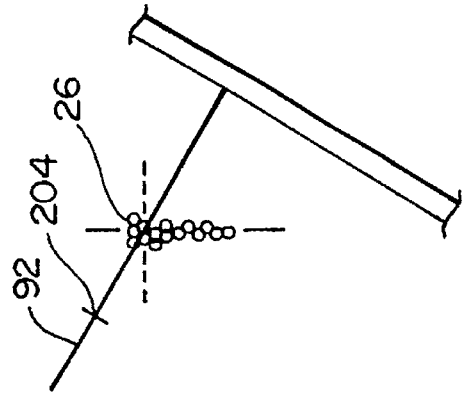

To discuss a further facet of the present invention, reference is made to FIGS. 7A and 7B, where it can be seen that in addition to the downward and laterally outward tilt of the shaft 75 (indicated at 75b in FIG. 7A and 7B) from the center of the harvesting apparatus, the shaft 75b can be tilted from the top also forwardly or rearwardly. Let us assume for the moment that the shaft 75b is given a forward and upward slant, it can be seen that by superimposing this slant on the shaft 75 as shown in FIGS. 10A-10B through FIGS. 17B-17B, the rate of the upward component of travel from FIGS. 10A-10B to FIGS. 13A-13B would be increased. The reason for this is that if the shaft 75 has an upward and forward slant, the rod 92 (as seen in FIG. 10B) would be seen to slant forwardly and downwardly when directed forwardly. Thus, as the rod 92 rises up to the location shown in FIGS. 11A and 11B, the rod would be lower than if the shaft 75 did not have the upward and forward slant. However, by the time the rod 92 reaches the location corresponding to FIGS. 13A-13B, it would have substantially the same location as shown in FIGS. 13A and 13B.

Figures 15A, 16A, 17A:
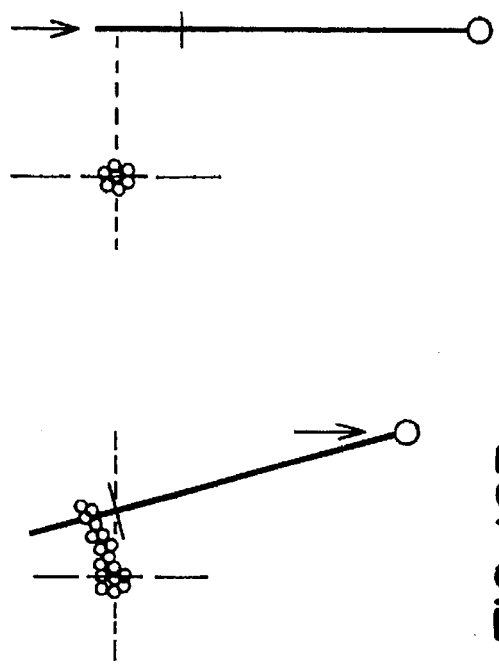
Figure 14B:
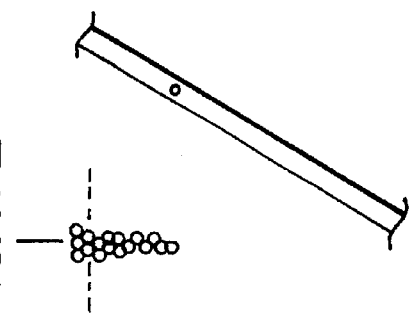
Figure 15B:
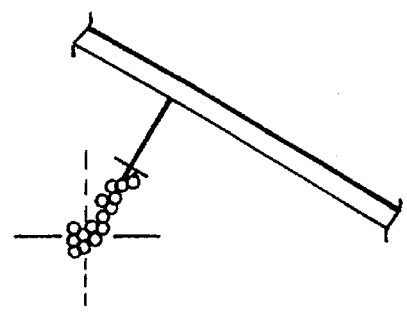
Figure 16B:
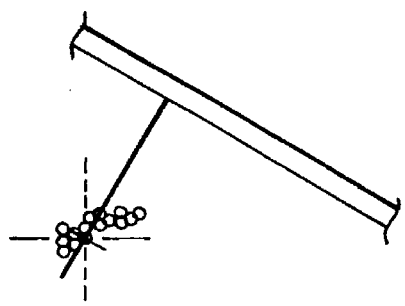

Likewise, the path of travel from FIGS. 13A-13B to FIG. 15A would be somewhat different since there would be an initial upward and rear component of travel in leaving the position of FIGS. 13A-13B, and a less steep downward path of travel toward the position of FIGS. 17A-17B.

A similar analysis can be done for the situation where the shaft 75 is given (in addition to its downward and laterally outward slope), an upward and rearward slope, also as shown in FIG. 7B. In this instance, the downward path of travel of the rod 92 would be increased and the upward path of travel decreased.

These analysis would indicate that by combining the forward to rear angular positioning of the shaft 75 of the beater rod assembly, when added to the movement inherent in the travel of the rods 92 as analyzed in the FIGS. 10A-10B through FIGS. 17A-17B can provide certain advantageous results and can permit the present invention to be utilized advantageously to meet different circumstances, this quite possibly depending on the circumstances existing with that particular crop.

It is evident that various modifications could be made to the present invention without departing from the basic teachings thereof.

What is claimed:

1. A method of harvesting produce, such as raisins, which grow from plants in a crop row, where plant portions bearing the produce extend from the crop row upwardly and outwardly in an upwardly and outwardly slanted growing zone in which the produce to be harvested is located, said growing zone having a width dimension parallel to an upward and outward slant of the growing zone and a thickness dimension perpendicular to the width dimension, said method comprising:

a. providing a beater rod assembly comprising a rotatable shaft which has a longitudinal axis and on which are mounted along the length of the shaft a plurality of beater rods extending radially outwardly from the shaft, said beater rod assembly being mounted to a harvesting machine which travels along crop rows in sequence;

b. positioning said beater rod assembly adjacent to said crop row so that the shaft extends upwardly and outwardly from the crop row with a substantial axial alignment component parallel to the slant of the growing zone, with at least the beater rods adjacent to the growing zone extending into the growing zone along a substantial portion of the width dimension thereof;

c. moving said beater rod assembly forwardly along said crop row so that the beater rods rotate in a produce engaging path inwardly into the growing zone through a substantial portion of a width dimension thereof, and then outwardly from the growing zone, with said path having path portions with substantial vertical components of travel relative to the produce in the growing zone;

d. imparting to said beater rod assembly an oscillating angular motion about the longitudinal axis of the shaft and/or an oscillating motion along the longitudinal axis of the shaft as said beater rod assembly travels along said crop row, whereby said beater rods engage said produce with a harvesting motion having substantial horizontal, vertical and oscillating components of travel;

e. said method further comprising first aligning said shaft assembly on one side of said harvesting machine so as to be in substantial alignment with, and adjacent to the growing zone of the one crop row, and then moving said beater rod assembly to an opposite side of said harvesting machine when traveling in an opposite direction along a second crop row so that said beater rod assembly is in substantial alignment with, and adjacent to, the growing zone of the second crop row.

2. The method as recited in claim 1, wherein said back and forth movement of the beater rod assembly is an angularly oscillating movement where said beater rods move back and forth about the axis of said shaft.

3. The method as recited in claim 1, wherein said back and forth motion has a substantial component of back and forth motion parallel to a lengthwise axis of said shaft.

4. The method as recited in claim 1, wherein said produce grows from said plants in bunches which hang in the growing zone in vertical alignment from the plant branches, and the vertical components of the harvesting path cause said beater rods to move, in at least a portion of the harvesting path, with a relative vertical alignment component of travel in harvesting contact with said bunches.

5. The method as recited in claim 4, wherein said produce is raisins, and said beater rod assembly is aligned so that at least some of the beater rods rotate in an upward path into the growing zone so as to have vertical components of motion relative to said produce, and move out of the growing zone having downward components of motion relative to the produce.

6. The method as recited in claim 5, wherein said shaft additionally has an upward and forward alignment component.

7. The method as recited in claim 5, wherein said shaft has additionally an upward and rearward slanted alignment component.

8. The method as recited in claim 4, wherein said shaft additionally has an upward and forward alignment component.

9. The method as recited in claim 4, wherein said wherein said shaft has additionally an upward and rearward slanted alignment component.

10. The method as recited in claim 1, wherein said beater rod assembly has an upper end and a lower end, said method further comprising connecting an upper end portion of said beater rod assembly to a lower end of a positioning rod and locating said beater rod assembly on one side of said harvesting machine with an upper end of said positioning rod being pivotally mounted at an center pivot location, then moving the upper end of said beater rod assembly in an arcuate path by rotating said positioning arm about said center pivot location to move the beater rod assembly to an opposite side of the harvesting machine.

11. The method as recited in claim 10, further comprising providing a second positioning rod and connecting one end of said second positioning rod to a lower end portion of said beater rod assembly and another end of said second positioning rod at a lower center location, and moving the said lower end of the beater rod assembly is moved in an arcuate path to the opposite side of the machine.

12. The method as recited in claim 1, comprising providing a positioning arm which is in substantial alignment with said shaft, with a lower end of said positioning arm connected to an upper end of said beater rod assembly and an upper end of said positioning arm mounted for vertical movement, moving said beater rod assembly from one side of said machine to an opposite side thereof by moving the positioning arm angularly to cause the beater rod assembly to move from the one side of the machine through a center portion of the machine to an opposite side thereof.

13. The method as recited in claim 1, further comprising connecting a lower end of a positioning rod to an upper end of said beater assembly and locating an upper end of the positioning arm at a upper central location, then moving the positioning arm about a vertical axis coincident with said upper center location circularly so that said beater assembly moves in a generally horizontal arcuate path from one side of said machine to the other opposite side of said machine.

14. A harvesting apparatus to harvest produce, such as raisins, which grow from plants in a crop row, where plant portions bearing the produce extend from the crop row upwardly and outwardly in an upwardly and outwardly slanted growing zone in which the produce to be harvested is located, said growing zone having a width dimension parallel to an upward and outward slant of the growing zone and a thickness dimension perpendicular to the width dimension, said apparatus comprising:
  a. a mobile chassis adapted to travel along the crop row;
  b. a beater rod assembly comprising a rotatable shaft which has a longitudinal axis and on which are mounted along the length of the shaft a plurality of beater rods extending radially outwardly from the shaft;
  c. mounting means to mount the beater rod assembly and position said beater rod assembly at a slant so that the shaft extends upwardly and inwardly to a center axis of the chassis, so that the beater rod assembly can be positioned with a substantial axial alignment component parallel to the slant of the growing zone, with at least the beater rods adjacent to the growing zone extending into the growing zone along a substantial potion of the width dimension there;
  d. power means to move the chassis forwardly along said crop row and to cause the beater rods to rotate in a produce engaging path inwardly into the growing zone to a substantial portion of a width dimension thereof, and then outwardly from the tee growing zone, with said path having path portions with substantial vertical components of travel relative to the produce in the growing zone, with an oscillating motion imparted to said beater rod assembly as said beater rod assembly travels along said crop row said oscillating motion being an oscillating angular motion about the longitudinal axis of the shaft and/or an oscillating motion along the longitudinal axis of the shaft, whereby said beater rods engage said produce with a harvesting motion having substantial horizontal, vertical and oscillating components of travel;
  e. said mounting means further comprises moving means further comprises moving means to move the beater rod assembly from one side of the harvesting machine to the other, said mounting means being arranged so that the beater rod assembly is moveably mounted to the harvesting apparatus so that the apparatus is able to travel along crop rows in sequence, by first positioning said beater rod assembly on one side of said harvesting machine so as to be in substantial alignment with, and adjacent to, the growing zone of the one crop row, and then causing the moving means to move said beater rod assembly to an opposite side of said harvesting machine when traveling in an opposite direction along a second crop row so that said beater rod assembly is in substantial alignment with, and adjacent to, the growing zone of the second crop row.

15. The apparatus as recited in claim 14, wherein said back and forth movement of the beater rod assembly is an angularly oscillating movement where said beater rods move back and forth about the axis of said shaft.

16. The apparatus as recited in claim 14, wherein said back and forth motion has a substantial component of back and forth motion parallel to a lengthwise axis of said shaft.

17. The apparatus as recited in claim 14, wherein said mounting means is arranged so that the shaft additionally can be positioned to slant with an upward and forward alignment component.

18. The apparatus as recited in claim 14, wherein said mounting means is arranged so that the shaft can be positioned to have additionally an upward and rearward slanted alignment component.

19. The apparatus as recited in claim 14, wherein said beater rod assembly has an upper end and a lower end, with an upper end portion of said beater rod assembly being connected to a lower end of a positioning rod of said mounting means and locating said beater rod assembly on one side of said harvesting machine with an upper end of said positioning rod being pivotally mounted at an upper center location, then moving the upper end of said beater rod assembly in an arcuate path by rotating said positioning arm about said center pivot location to move the beater rod assembly to an opposite side of the harvesting machine.

20. The apparatus as recited in claim 19, wherein there is a second positioning rod having one end connected to a lower end portion of the beater rod assembly, and a second end being pivotally connected at a lower center location, in a manner that when the beater assembly is moved from one side of the apparatus to the other, the lower end of the beater rod assembly is moved in an arcuate path to the opposite side of the apparatus.

21. The apparatus as recited in claim 14, wherein there is a positioning arm which is in substantial alignment with the shaft of the beater rod assembly, with the lower end of the positioning arm connected to an upper end of the beater rod assembly, an upper end of the positioning arm mounted for vertical movement, said mounting means being arranged to move the rod assembly from one side of the machine to an opposite side thereof by moving the positioning arm angularly to cause the beater rod assembly to move from one side of the apparatus through a center portion of the apparatus to an opposite thereof.

22. The apparatus as recited in claim 14, wherein there is a positioning rod having a lower end connected to an upper end of the beater rod assembly, with an upper end of the positioning arm in an upper center location, said positioning arm being mounted movement about a vertical axis coincident with said upper center location, whereby said positioning arm can be moved circularly about said axis so that the beater assembly moves in a generally horizontal arcuate path from one side of the machine to the opposite side of the machine.

23. A method harvesting produce, such as raisins, which grow from plants in a crop row that extends along a crop row alignment axis, where plant portions bearing the produce extend from the crop row upwardly and outwardly in an upwardly and outwardly slanted growing zone in which the produce to be harvested is located, said growing zone having a width dimension parallel to an upward and outward slant of the growing zone and a thickness dimension perpendicular to the width dimension, said method comprising:
   a. providing a beater rod assembly comprising a rotatable shaft which has a longitudinal axis and on which are mounted along the length of the shaft a plurality of beater rods extending radially outwardly from the shaft;
   b. positioning said beater rod assembly adjacent to said crop row so that the shaft extends upwardly and outwardly from the crop row with a substantial axial alignment component parallel to the slant of the growing zone, and with a slanting alignment component relative to said crop row alignment axis so that said shaft makes an angle with said crop row alignment axis less than a right angle, with at least the beater rods adjacent to the growing zone extending into the growing zone along a substantial portion of the width dimension thereof;
   c. moving said beater rod assembly forwardly along said crop row so that the beater rods rotate in a produce engaging path inwardly into the growing zone through a substantial portion of a width dimension thereof, and then outwardly from the growing zone, with said path having path portions with substantial vertical components of travel relative to the produce in the growing zone;
   d. imparting to said beater rod assembly an oscillating angular motion about the longitudinal axis of the shaft and/or an oscillating motion along the longitudinal axis of the shaft, as said beater rod assembly travels along said crop row, whereby said beater rods engage said produce with a harvesting motion having substantial horizontal, vertical and oscillating components of travel.

24. The method as recited in claim 23, wherein said shaft has an upward and forward slanting alignment component.

25. The method as recited in claim 23, wherein said shaft has additionally an upward and rearward slanting alignment component.

26. The method as recited in claim 23, wherein said produce grows from said plants in bunches which hang in the growing zone in vertical alignment from the plant branches, and the vertical components of the harvesting path cause said beater rods to move, in at least a portion of the harvesting path, with a relative vertical alignment component of travel in harvesting contact with said bunches.

27. The method as recited in claim 23, wherein said produce is raisins, and said beater rod assembly is aligned so that at least some of the beater rods rotate in an upward path into the growing zone so as to have vertical components of motion relative to said produce, and move out of the growing zone having downward components of motion relative to the produce.

28. A harvesting apparatus to harvest produce, such as raisins, which grow from plants in a crop row that extends along a crop row alignment axis, where plant portions bearing the produce extend from the crop row upwardly and outwardly in an upwardly and outwardly slanted growing zone in which the produce to be harvested is located, said growing zone having a width dimension parallel to an upward and outward slant of the growing zone and a thickness dimension perpendicular to the width dimension, said apparatus comprising;
   a. a mobile chassis having a longitudinal center axis and adapted to travel along the crop row with the longitudinal center axis generally parallel with the crop row alignment axis;
   b. a beater rod assembly comprising a rotatable shaft which has a longitudinal axis and on which are mounted along the length of the shaft a plurality of beater rods extending radially outwardly from the shaft;
   c. mounting means to mount the beater rod assembly and position said beater rod assembly at a slant so that the shaft extends upwardly and inwardly toward the longitudinal center axis of the chassis and with a slanting alignment component relative to said longitudinal center axis less than a right angle, so that the beater rod assembly can be positioned with a substantial axial alignment component parallel to the slant of the growing zone, with at least the beater rods adjacent to the growing zone extending into the growing zone along a substantial portion of the width dimension thereof;
   d. power means to move the chassis forwardly along said crop row and to cause the beater rods to rotate in a produce engaging path inwardly into the growing zone to a substantial portion of a width dimension thereof, and then outwardly from the growing zone, with said path having path portions with substantial vertical components of travel relative to the produce in the growing zone, with an oscillating motion imparted to said beater rod assembly as said beater rod assembly travels along said crop row said oscillating being an oscillating angular motion about the longitudinal axis of the shaft and/or an oscillating motion along the longitudinal axis of the shaft, whereby said beater rods engage said produce with a harvesting motion having substantial horizontal, vertical and oscillating components of travel.

29. The apparatus as recited in claim 28, wherein said back and of the motion has a substantial component of back and forth motion parallel to a lengthwise axis of said shaft.

30. The apparatus as recited in claim 28, wherein said mounting means is arranged so that the shaft additionally can be positioned to slant with an upward and forward alignment component.

31. The apparatus as recited in claim 28, wherein said mounting means is arranged so that the shaft can be positioned to have an upward and rearward slanted alignment component.

32. A method of harvesting raisins which grow from plants in a crop row, where plant portions bearing the raisins extend from the crop row upwardly and outwardly in an upwardly and outwardly slanted growing zone in which the raisins to be harvested are located, said growing zone having a width dimension parallel to an upward and outward slant of the growing zone a thickness dimension perpendicular to the width dimension, said method comprising;

a. providing a beater rod assembly comprising a rotatable shaft having a longitudinal axis and on which are mounted along the length of the shaft a plurality of beater rods extending radially outwardly from the shaft:

b. positioning said beater rod assembly adjacent to said crop row so that the shaft extends upwardly and outwardly from the crop row with a substantial axial alignment component parallel to the slant of the growing zone, with at least the beater rods adjacent to the growing zone extending into the growing zone along a substantial portion of the width dimension thereof;

c. moving said beater rod assembly forwardly along said crop row so that the beater rods rotate in a produce engaging path inwardly into the growing zone through a substantial portion of a width dimension thereof, and the outwardly from the growing zone, with said path having path portions with substantial vertical components of travel relative to the produce in the growing zone;

d. Imparting a back and forth motion to said beater rods as said beater rod assembly travels along said crop row, with said back and forth motion having a substantial alignment component parallel to a lengthwise axis of said shaft, whereby said beater rods engage said produce with a harvesting motion having substantial horizontal and vertical components of travel, with a back and forth component of travel being superimposed thereon.

33. The method as recited in claim 32, wherein said shaft additionally has an upward and forward alignment component.

34. The method as recited in claim 32, wherein said shaft has additionally an upward and rearward slanted alignment component.

35. A harvesting apparatus to harvest raisins which grow the plants in a crop row, where plant portions bearing the raisins extend from the crop row upwardly and outwardly in an upwardly and outwardly slanted growing zone in which the raisins to be harvested are located, said growing zone having a width dimension parallel to an upward and outward slant of the growing zone and a thickness dimension perpendicular to the width dimension, said apparatus comprising;

a. a mobile chassis adapted to travel along the crop row;

b. a beater rod assembly comprising a rotatable shaft having a longitudinal axis and on which are mounted along the length of the shaft a plurality of beater rods extending radially outwardly from the shaft;

c. mounting means to mount the beater rod assembly and position said beater rod assembly at a slant so that the shaft extends upwardly and inwardly to a center axis of this chassis, so that the beater rod assembly can be positioned with a substantial axial alignment component parallel to the slant of the growing zone, with at least the beater rods adjacent to the growing zone extending into the growing zone along a substantial portion of the width dimension thereof;

d. power means to move the chassis forwardly along said crop row and to cause the beater rods to rotate in a produce engaging path inwardly into the growing zone to a substantial portion of a width dimension thereof, and then outwardly from the growing zone, with said path having path portions with substantial vertical components of travel relative to the produce in the growing zone, with a back and forth motion imparted to said beater rods as said beater rod assembly travels along said crop row, said back and forth motion having a substantial alignment component parallel to a lengthwise axis of the shaft, whereby said beater rods engage said produce with a harvesting motion having substantial horizontal and vertical components of travel, with a back and forth component of travel being superimposed thereon.

36. The apparatus as recited in claim 35, wherein said mounting means is arranged so that the shaft additionally can be positioned to slant with an upward and forward alignment component.

37. The apparatus as recited in claim 35, wherein said mounting means is arranged so that the shaft can be positioned to have additionally an upward and rearward slanted alignment component.

38. A method of harvesting raisins, which grow from plants in a crop row, where plant portions bearing the raisins extend from the crop row upwardly and outwardly in an upwardly and outwardly slanted growing zone in which the raisins to be harvested are located, said growing zone having a width dimension parallel to an upward and outward slant of the growing zone and a thickness dimension perpendicular to the width dimension, said method comprising:

a. providing a beater rod assembly comprising a rotatable shaft on which are mounted along a longitudinal axis of the shaft a plurality of beater rods extending radially outwardly from the shaft;

b. positioning said beater rod assembly adjacent to said crop row so that the shaft extends upwardly and outwardly from the crop row with a substantial axial alignment component parallel to the slant of the growing zone, with at least the beater rods adjacent to the growing zone extending into the growing zone;

c. moving said beater rod assembly forwardly along said crop row so that the beater rods rotate in a produce engaging path inwardly into the growing zone through a substantial portion of a width dimension thereof, and then outwardly from the growing zone, with said path having path portions with substantial vertical components of travel relative to the produce in the growing zone;

d. imparting to said beater rod assembly a back and forth motion having a substantial path component parallel to the longitudinal axis of the shaft, as said beater rod assembly travels along said crop row.

39. The method as recited in claim 38, wherein the longitudinal axis of the shaft of the beater rod assembly is angled from a vertical alignment axis by an angle of approximately one third of a right triangle.

40. The method as recited in claim 39, wherein the beater rods have a substantial right angle component of alignment relative to the longitudinal axis of the shaft of the beater rod assembly.

41. The method as recited in claim 40, wherein the beater rods are substantially perpendicular to the longitudinal axis of the shaft of the beater rod assembly.

42. A harvesting apparatus to harvest raisins, which grow from plants in a crop row, where plant portions bearing the raisins extend from the crop row upwardly and outwardly in an upwardly and outwardly slanted growing zone in which the raisins to be harvested are located, said growing zone having a width dimension parallel to an upward and outward slant of the growing zone and a thickness dimension perpendicular to the width dimension, said apparatus comprising:

a. a mobile chassis adapted to travel along the crop row;

b. a beater rod assembly comprising a rotatable shaft on which are mounted along a longitudinal axis of the shaft a plurality of beater rods extending radially outwardly from the shaft;

c. mounting means to mount the beater rod assembly and position said beater rod assembly at a slant so that the shaft extends upwardly and inwardly to a center axis of the chassis, so that the beater rod assembly are positioned with a substantial axial alignment component parallel to the slant of the growing zone, with at least the beater rods adjacent to the growing zone extending into the growing zone;

d. power means to move the chassis forwardly along said crop row and to cause the beater rods to rotate in a produce engaging path inwardly into the growing zone to a substantial portion of a width dimension thereof, and then outwardly from the growing zone, with said path having path portions with substantial vertical components of travel relative to the raisins in the growing zone;

e. means to impart a back and forth motion, having a substantial path component parallel to the longitudinal axis of the shaft, to said beater rod assembly as said beater rod assembly travels along said crop row.

43. The apparatus as recited in claim 42, wherein the longitudinal axis of the shaft of the beater rod assembly is angled from a vertical alignment axis by an angle of approximately one third of a right triangle.

44. The apparatus as recited in claim 43, wherein the beater rods have a substantial right angle component of alignment relative to the longitudinal axis of the shaft of the beater rod assembly.

45. The apparatus as recited in claim 42, wherein the beater rods are substantially perpendicular to the longitudinal axis of the shaft of the beater rod assembly.

* * * * *